United States Patent Office 2,916,470
Patented Dec. 8, 1959

2,916,470

PROCESS FOR THE VULCANIZING OF A RUBBER AND CARBON BLACK COMPOSITION CONTAINING ALPHA-IODO-ACETIC ACID

Kenneth W. Doak, Bloomfield, N.J., assignor to United States Rubber Company, New York, N.Y., a corporation of New Jersey No Drawing. Application November 16, 1953
Serial No. 392,485

5 Claims. (Cl. 260—41.5)

This invention relates to improvements in the technique of processing high carbon black-rubber mixes prior to vulcanization thereof, and more particularly to improvements in so-called "low-hysteresis" processing of mixtures of carbon black and rubber.

The technique of processing high carbon black and rubber mixes prior to vulcanization thereof, whereby to obtain vulcanizates with improvements in physical and chemical properties, is described in Gerke et al. U.S.P. 2,118,601. The improved vulcanizates prepared by the technique of Gerke et al. differ from the usual vulcanizates produced by older techniques in that they have relatively (1) lower modulus at low elongation, (2) higher modulus above 300% elongation, (3) higher resistance to abrasion, (4) lower torsional hysteresis, and (5) higher electrical resistivity, and are (6) relatively softer.

These improved vulcanizates are obtained, in accordance with the Gerke et al. technique, by incorporating in the rubber a relatively large amount of carbon black, for example, at least 25 parts, and preferably in the case of tire treads at least 40 parts by weight of carbon black per 100 parts by weight of rubber, and then subjecting a substantially homogeneous mixture of the ingredients to a heat treatment at a temperature substantially above 250° F., the preferred temperature being in the range from about 300° F. to 370° F., and masticating the mix during and/or after such heat treatment, or alternately therewith. The duration of the special heat treatment may vary with the temperature employed, the higher the temperature the shorter the time, and is governed also by the degree of change desired in the properties of the ultimate vulcanized product which properties are gauged to be compatible with its final use. In general, heat treatments of from 10 to 60 minutes' duration will be found suitable for most purposes, and particularly within the preferred temperature range.

An object of the present invention is to provide new chemical promotors for the processing of rubber and carbon black mixes as described in U.S.P. 2,118,601 whereby to obtain high electrical resistance and low torsional hysteresis of tread stocks. A further object is to provide substantial decreases in the time of the low hysteresis processing by the use of the herein disclosed chemicals with consequent increase in the capacity and output of equipment. Other objects will appear more fully hereinafter.

I have found that alpha-iodo carboxylic derivatives substantially decrease the time and/or reduce the temperature necessary for low-hysteresis processing. These compounds contain the grouping

I particularly prefer to use saturated aliphatic alpha-iodo carboxylic acids, lower alkyl ($C_1$ to $C_6$) esters thereof, and amides thereof. Examples of operative promoters in the invention are:

Iodoacetic acid
Methyl, ethyl or propyl iodoacetate
Iodoacetamide
Iodochloroacetic acid
Iodochloroacetamide
Alpha-iodopropionic acid
Ethyl alpha-iodopropionate
Alpha-iodopropionamide
Alpha-iodo-n-butyric acid
Alpha-iodo-iso-butyric acid
Diiodoacetic acid
Triiodoacetic acid
Diiodoacetamide
Iodofluoroacetic acid
Iodofluoroacetamide
Ethyl iodofluoroacetate It will be seen that the carbon atom adjacent to the carbonyl group can bear more than one iodine atom. In addition to iodine, this carbon atom may bear one or more atoms of halogen other than iodine, e.g., chlorine, bromine or fluorine.

These promoters are effective in natural rubber (e.g., Hevea rubber), in synthetic rubbery homopolymers of aliphatic conjugated diolefin hydrocarbons, especially butadiene and isoprene, and in synthetic rubbery copolymers of such diolefin hydrocarbons with copolymerizable monoolefinic compounds, such as isobutylene, styrene, alpha-methyl styrene, methyl acrylate, ethyl acrylate, methyl methacrylate, acrylonitrile, methyl vinyl ketone, methyl isopropenyl ketone, and mono-vinylpyridines. They are particularly effective in natural rubber, in copolymers of a major proportion, typically from 90 to 99.5% of isobutylene and a minor proportion, typically correspondingly from 10 to 0.5%, of an aliphatic conjugated diolefin hydrocarbon, especially butadiene or isoprene (known commercially as "Butyl rubber"), and in copolymers of butadiene and styrene (known as "GR–S").

The process of my invention comprises mixing natural rubber or a synthetic rubbery polymer of an aliphatic conjugated diolefin, i.e., an aliphatic conjugated diolefin homopolymer or copolymer, with a relatively large amount of a rubber-reinforcing carbon black and a relatively small but effective amount, typically, from 1 to 3 parts, per 100 parts of rubbery material, of an alpha-iodo carboxylic derivative of the type disclosed above, and heating this mixture at a temperature of from 275° F. to a temperature just short of that at which the rubber would be injured, to bring about the desired changes in the rubber-carbon black mixture whereby a vulcanizate of this mixture will have a considerably reduced torsional hysteresis and a considerably increased electrical resistivity. This heat treatment is carried out in the absence of vulcanizing agents, e.g., sulfur or sulfur-yielding compounds. Following the heat treatment, the vulcanizing and other desired compounding ingredients including conventional accelerators and the like are intimately incorporated in the conventional manner, after which the mixture is shaped and vulcanized in the usual way.

Any carbon black which is capable of reinforcing the rubber can be used in the practice of my invention. I usually use either a furnace black or a channel black. Those skilled in the art will appreciate that the type of black is often selected with reference to the particular rubber employed. The amount of carbon black present during the heat treatment should be equal to at least 25 parts per 100 parts by weight of rubber. Preferably the amount of carbon black is equal to at least 40 parts per 100 parts of rubber, the use of such high proportions of carbon black being particularly desirable in the case of tread stocks. The amount of carbon black present during the heat treatment can be as great as 100 parts per 100 parts of rubber.

In the preferred practice of my invention, the heat treatment of the mixture of rubber, carbon black and alpha-iodocarboxylic compound is carried out by mastication at temperatures in the range of 275–400° F., and more preferably in the range of 300–400° F., with any suitable type of masticating equipment such as an open two-roll rubber mill or more preferably an internal rubber mixer, especially a Banbury mixer. The Banbury mixer is particularly advantageous because it exerts a severe masticatory action upon the charge and because it conserves the heat generated by the mixing action and this heat greatly aids in elevation of the stock temperature to within the desired range. Depending upon the size and operating speed of the Banbury mixer, and other factors, extraneous heat may or may not need to be applied to bring the stock temperature within the desired temperature range and to hold it there. If desired, extraneous cooling may be applied to keep the temperature from rising above the desired level.

The optimum duration of the heat treatment will vary depending upon many factors, including the temperature of heat treatment, type of heat treatment, i.e., whether it is static or dynamic, type of equipment used, e.g., in the case of masticatory heat treatment whether an open rubber mill or a Banbury or other type of internal mixer is used, amount of alpha-iodocarboxylic compound used, etc. In any event, the treating time will be considerably shorter, at given temperature conditions, than the time required when the alpha-iodocarboxylic compound is omitted. In the case of the preferred masticatory treatment, times of the order of 5 to 30 minutes will generally be adequate for the purposes of my invention, the longer times being used at the lower temperatures and vice versa. It is well known that different rubbers vary as to the highest temperatures they can withstand without harm and the time and temperature should of course be so regulated as to not impair the properties of the final vulcanizate.

When my invention is applied to "Butyl rubber," the heat treatment is usually performed at a higher temperature and for a longer time than is the case with natural rubber or "GR–S," in order to bring about the same reduction in torsional hysteresis and increase in electrical resistivity. With Butyl rubber a temperature of at least 325° F. is preferred, mastication at 325–400° F. being especially preferred.

It is preferable to form an intimate mixture of the rubber, carbon black and alpha-iodocarboxylic compound at a relatively low temperature, i.e., below 275° F., in order to avoid premature reaction of the iodo compound whereby its promoting effect upon the low-hysteresis processing would be seriously reduced.

The following examples illustrate the preferred methods of practicing the invention. All parts are by weight.

Example 1

A masterbatch is prepared by mixing together 100 parts of Hevea rubber, 50 parts of carbon black (a medium processing channel black known commercially as "Spheron-6"), and 5 parts of stearic acid. This mixing operation is carried out in the conventional manner in a Banbury mixer or on a two-roll rubber mill. To 155 parts of this masterbatch 1.9 parts iodoacetic acid is added on a two-roll rubber mill below 275° F. The mill temperature is then raised to 300° F. and the mixture is masticated 10 minutes. Thereafter the mill is cooled to 150–200° F. and 2 parts of pine tar, 2 parts of zinc oxide, 1 part of antioxidant, 1 part of accelerator, and 2.6 parts of sulfur are incorporated. The mixture is placed in a suitable mold and vulcanized for 45 minutes ate 287° F. As a control an identical masterbatch is prepared and subjected to all the previously described manipulative steps except that no iodoacetic acid is added to the mixture. The specific electrical resistivity and torsional hysteresis are measured, with the following results:

| | Log Resistivity | Tors. Hyst., 280° F. |
| --- | --- | --- |
| Control | 7.5 | 0.130 |
| Sample with iodoacetic acid | >13.0 | 0.074 |

The practice of the invention has thus lowered the torsional hysteresis at 280° F. by 44% and has increased the specific electrical resistivity by a factor of over 100,000. In the absence of a chemical promoter, times of 30–60 minutes and temperatures of 325–350° F. would be required to obtain these results.

Example 2

A masterbatch of a butadiene-styrene copolymer (GR–S polymerized at 41° F.) containing 52 parts of a medium processing channel black ("Spheron #6"), 6 parts of hydrocarbon oil and 1 part of stearic acid is treated with 2.5 parts of iodoacetic acid in a manner similar to that of Example 1, except that the high temperature mastication is carried out for 6 minutes at 325° F. in a laboratory Banbury mixer. The heat-treated stocks are then compounded with 3 parts of zinc oxide, 2 parts of sulfur, and accelerators, and vulcanized (45' at 293° F.). The specific electrical resistivity and torsional hysteresis are measured with the following results:

| | Log Resistivity | Tors. Hyst., 280° F. |
| --- | --- | --- |
| Control | 8.5 | 0.151 |
| Sample with iodoacetic acid | >13.0 | 0.085 |

Example 3

A masterbatch of an isobutylene-isoprene copolymer ("Butyl-15") containing 50 parts of a medium processing channel black ("Spheron #6") is treated with 1.5 parts of iodoacetic acid in a manner similer to that of Example 1. High-temperature mastication is carried out for 15 minutes at 375° F. in a Banbury mixer. The stocks are then compounded with 5 parts of zinc oxide, 3 parts of stearic acid, 1 part of tetramethylthiuram disulfide, 0.5 part of 2-mercaptobenzothiazole, and 2 parts of sulfur, and vulcanized (45' at 293° F.). The results are given below.

| | Log Resistivity | Tors. Hyst., 280° F. |
| --- | --- | --- |
| Control | 6.9 | 0.156 |
| Sample with iodoacetic acid | >13.0 | 0.093 |

The above examples demonstrate that iodoacetic acid reduces torsional hysteresis and increases the specific electrical resistivity of mixtures of carbon black and Hevea rubber, butadiene-styrene copolymers (GR–S), and isobutylene-isoprene copolymers (Butyl rubber).

Although I have disclosed my invention with particular emphasis upon the preferred practice wherein the heat treatment is accompanied with mastication, nevertheless my invention can be practiced by carrying out the heat treatment under static conditions. For example, I may intimately mix the rubber, carbon black and alpha-iodo carboxylic derivative in any suitable manner and then heat this mixture at 275–400° F. without simultaneously masticating it, the heat-treated mixture being subsequently masticated and compounded with conventional compounding and vulcanizing ingredients followed by shaping and vulcanizing in the usual way. The static heat-treatment can be conducted by placing slabs of the stock in an oven heated to a suitable temperature, or slabs of hot stock can be stacked up and allowed to stand for several hours, preferably under relatively non-heat-conductive conditions, in order to maintain the mixture at the temperature of 275–400° F. for as long as reasonably possible. If desired, the slabs can be wrapped with a suitable insulating blanket to cause prolonged retention of heat. Such static heat treatment has the advantage of releasing the Banbury equipment from use for carrying out the heat treatment and this may be desirable under certain conditions.

The electrical resistivity values given in the above examples were determined by measuring the resistance of a specimen of known thickness (about 0.1 inch) placed between mercury electrodes, under a potential difference of 135 volts, using a sensitive galvanometer with an Ayrton shunt. The logarithm (to base 10) of the specific electrical resistivity (expressed in ohm-cms.) is designated "Log Resistivity."

The torsional hysteresis figures represent the logarithmic decrement (to base 10) of the observed amplitudes of successive oscillations of a torsion pendulum, measured at 280° F. with an apparatus consisting essentially of a torsion pendulum in which the sample of rubber tested supplies the restoring force when the pendulum is deflected. For further description of this test see Gerke et al., 2,118,601.

Having thus described my invention, what I claim and desire to protect by Letters Patent is:

1. A process which comprises mixing natural rubber with a relatively large amount of a rubber-reinforcing carbon black and from 1 to 3 parts of iodoacetic acid per 100 parts of said rubber, masticating the mixture in the absence of vulcanizing agents at a temperature of from 275 to 400° F., thereafter incorporating vulcanizing and other desired ingredients, shaping the mass, and vulcanizing the resulting shaped mass.

2. A process which comprises mixing a rubbery copolymer of butadiene and styrene with a relatively large amount of a rubber-reinforcing carbon black and from 1 to 3 parts of iodoacetic acid per 100 parts of said copolymer, masticating the mixture in the absence of vulcanizing agents at a temperature of from 275 to 400° F., thereafter incorporating vulcanizing and other desired ingredients, shaping the mass, and vulcanizing the resulting shaped mass.

3. A process which comprises mixing a rubbery copolymer of isobutylene and an aliphatic conjugated diolefin with a relatively large amount of a rubber-reinforcing carbon black and from 1 to 3 parts of iodoacetic acid per 100 parts of said rubbery copolymer, masticating the mixture in the absence of vulcanizing agents at a temperature of from 325 to 400° F., thereafter incorporating vulcanizing and other desired ingredients, shaping the mass, and vulcanizing the resulting shaped mass.

4. A process which comprises mixing rubber selected from the group consisting of natural rubber, synthetic rubbery homopolymers of aliphatic conjugated diolefin hydrocarbons, and synthetic rubbery copolymers of such diolefin hydrocarbons with copolymerizable monoolefinic compounds, with a relatively large amount or rubber-reinforcing carbon black and from one to three parts of iodoacetic acid per 100 parts of said rubber, heating the mixture in the absence of vulcanizing agents at a temperature of at least 275° F. but below that at which the rubber would be harmed, thereafter incorporating vulcanizing and other desired ingredients, shaping the mass, and vulcanizing the resulting shaped mass.

5. A process which comprises mixing rubber selected from the group consisting of natural rubber, synthetic rubbery homopolymers of aliphatic conjugated diolefin hydrocarbons, and synthetic rubbery copolymers of such diolefin hydrocarbons with copolymerizable monoolefinic compounds, with a relatively large amount of rubber-reinforcing carbon black and from one to three parts of iodoacetic acid per 100 parts of said rubber, masticating the mixture in the absence of vulcanizing agents at a temperature of from 275 to 400° F., thereafter incorporating vulcanizing and other desired ingredients, shaping the mass and vulcanizing the resulting shaped mass.

References Cited in the file of this patent

UNITED STATES PATENTS

| | | |
|---|---|---|
| 2,118,601 | Gerke et al. | May 24, 1938 |
| 2,481,811 | Barton | Sept. 13, 1949 |
| 2,710,287 | Barton et al. | June 7, 1955 |